United States Patent [19]

Bowen

[11] 4,007,120
[45] Feb. 8, 1977

[54] OXIDATION AND OZONATION CHAMBER

[75] Inventor: James H. Bowen, MacClenny, Fla.

[73] Assignee: BDH, Inc.(Entire), Rome, Ga.

[22] Filed: July 17, 1975

[21] Appl. No.: 596,892

Related U.S. Application Data

[63] Continuation-in-part of Ser. No. 539,908, Jan. 9, 1975, abandoned.

[52] U.S. Cl. .............................. 210/120; 210/123; 210/192; 210/218; 210/219; 210/220; 210/320

[51] Int. Cl.² ...................... C02B 3/08; C02C 5/04

[58] Field of Search ................. 137/202; 210/7, 15, 210/62, 63, 218, 219, 220, 221 R, 242 A, 319, 320, 192, 120, 123; 261/93; 21/74 A

[56] References Cited

UNITED STATES PATENTS

| | | | |
|---|---|---|---|
| 1,797,147 | 3/1931 | Imhoff et al. | 261/93 |
| 2,036,280 | 4/1936 | Knight | 210/219 |
| 2,238,024 | 4/1941 | Linch | 210/319 |
| 2,425,070 | 8/1947 | Nicolette | 137/202 |
| 2,540,948 | 2/1951 | Jeffery | 210/219 X |
| 3,054,602 | 9/1962 | Proudman | 210/218 X |
| 3,335,081 | 8/1967 | El-Naggar | 210/221 R X |
| 3,336,099 | 8/1967 | Czulak et al. | 210/63 X |
| 3,660,277 | 5/1972 | McWhirter et al. | 210/220 X |
| 3,681,236 | 8/1972 | Bergles et al. | 210/62 X |
| 3,802,674 | 4/1974 | Hori | 261/93 |

FOREIGN PATENTS OR APPLICATIONS

577,517   5/1946   United Kingdom ............... 210/219

Primary Examiner—Charles N. Hart
Assistant Examiner—Robert H. Spitzer
Attorney, Agent, or Firm—Clarence A. O'Brien; Harvey B. Jacobson

[57] ABSTRACT

An ozone and oxidation chamber for treating a liquid has a housing provided with an influent line and an effluent line spaced from one another for creating a flow of a liquid through the housing. At least one rotatable axle provided with an agitating blade is arranged extending through the housing transverse to the influent and effluent lines, and to the path of liquid being treated, for agitating the liquid in order to mix into the liquid at a high rate oxygen and ozone received from an injection nozzle directed into the liquid and toward the blade. The rotation of the agitator blade is adequate to generate sufficient frictional forces created during the passage of the blade through the liquid to create static electricity on the blade that facilitates conversion of oxygen injected into the liquid, and found in the liquid itself, into ozone which kills germs, virus, and the like in the liquid.

5 Claims, 5 Drawing Figures

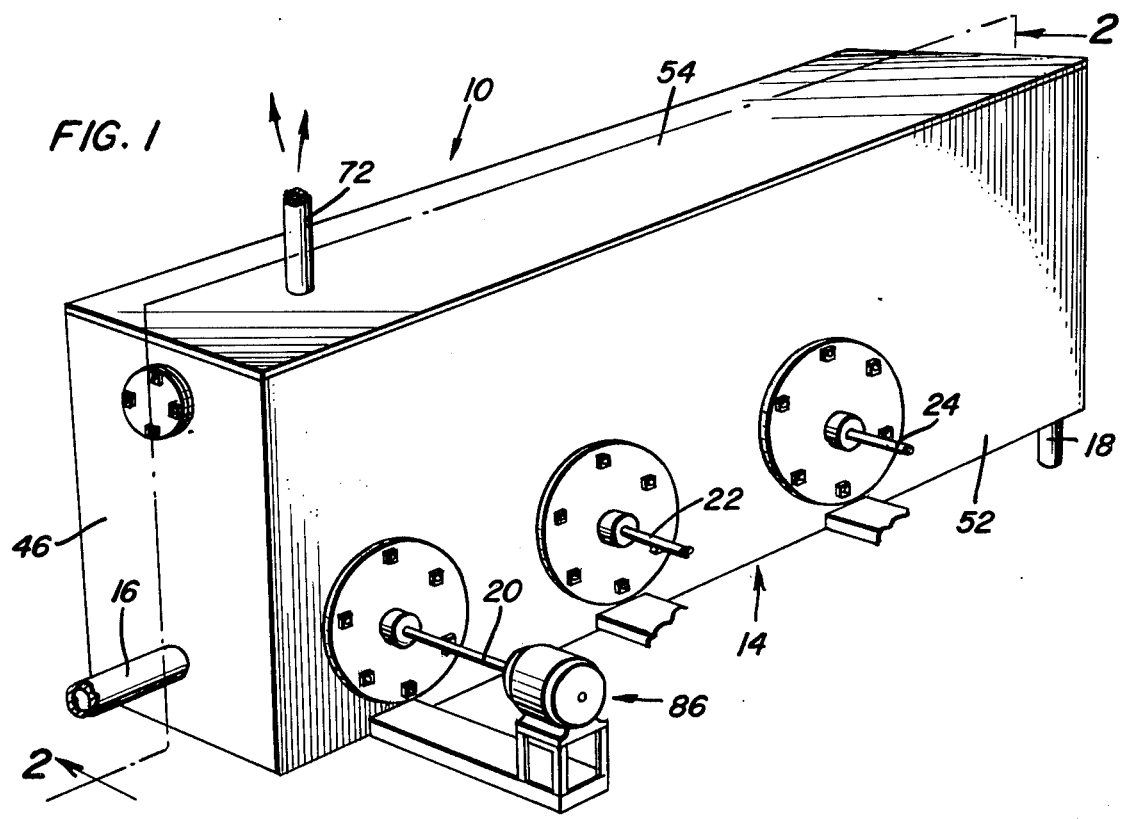
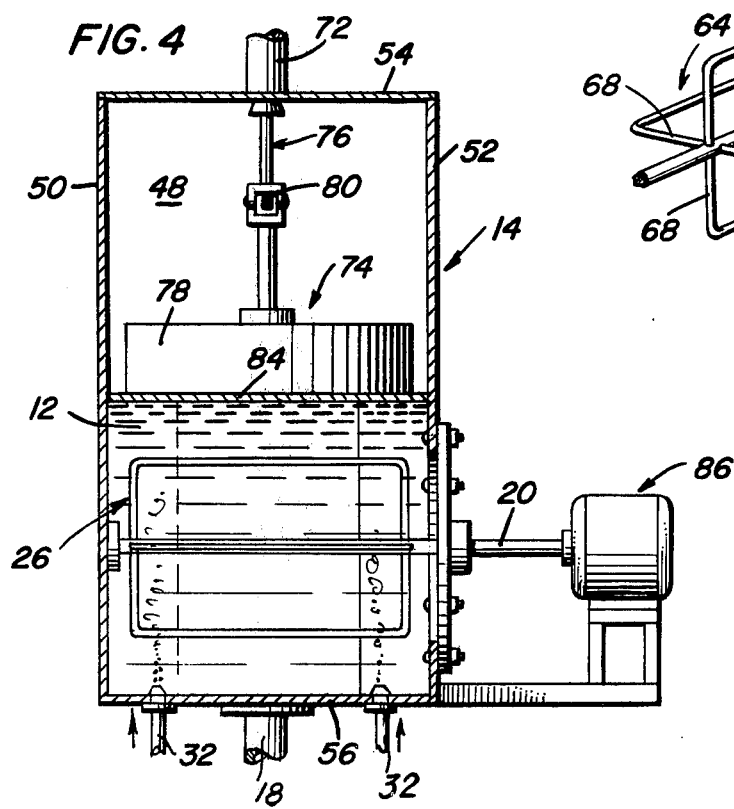
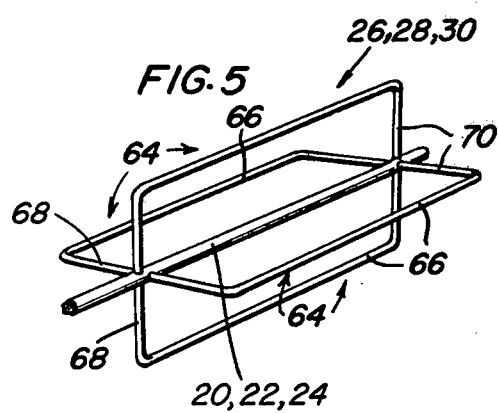

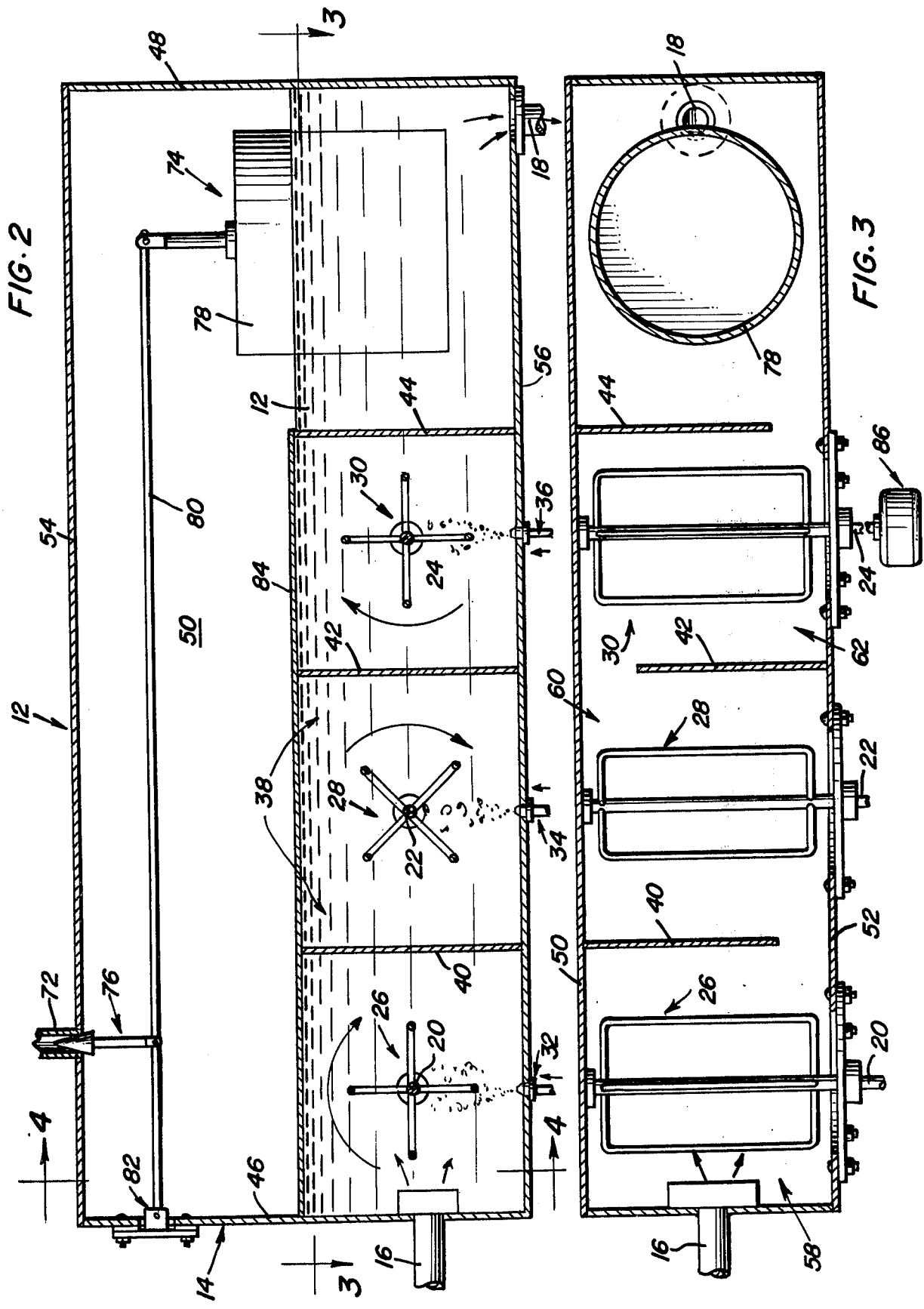

OXIDATION AND OZONATION CHAMBER

CROSS REFERENCE TO A RELATED APPLICATION

This is a continuation-in-part of my U.S. Application Ser. No. 539,908, filed Jan. 9, 1975, now abandoned.

BACKGROUND OF THE INVENTION

1. Field of the Invention

This invention relates generally to the purification of waste water and other liquids, and particularly to an ozone and oxidation chamber for use in a water purification system.

2. Description of the Prior Art

It is generally known to use paddle-wheel arrangements to aerate sewage and similar waste liquids in order to facilitate purification of the sewage. A typical arrangement is set forth in U.S. Pat. No. 2,036,280, issued Apr. 7, 1936 to R. R. Knight, which discloses a sewage aerator having compartmentized agitators. Further, U.S. Pat. Nos. 3,660,277, issued May 2, 1972 to J. R. McWhirter et al; 3,725,258, issued Apr. 3, 1973, to M. L. Spector et al; and 3,772,188, issued Nov. 13, 1873 to R. N. Edwards, disclose oxidation-ozonation systems employing partial baffles in order to permit a tortuous flow between compartments of the systems. These known oxidation and ozonation systems, however, generally fail to achieve sufficient efficiency to satisfy contemporary purification requirements.

I am aware of the following additional patents that may be pertinent to the invention:

U.S. Pat. No. 3,224,964 G. Berenk et al Dec. 21, 1965
U.S. Pat. No. 3,276,994 C. W. Andrews Oct. 4, 1966
U.S. Pat. No. 3,503,876 J. S. Stone Mar. 31, 1970
U.S. Pat. No. 3,523,891 R. C. Mehl Aug. 11, 1970

SUMMARY OF THE INVENTION

It is an object of the present invention to provide an oxidation and ozonation chamber which permits more efficient purification of gases and liquids than is realized by known constructions.

It is another object of the present invention to provide an oxidation and ozonation chamber designed to mix oxygen and ozone into a liquid being treated at a high rate of speed in order to more efficiently purify the liquid being treated.

It is yet another object of the present invention to provide an oxidation and ozonation chamber which is simple yet reliable in operation, and requires a minimum of operator attention and maintenance.

These and other objects are achieved according to the present invention by providing an oxidation and ozonation chamber having: a housing provided with an influent line and an effluent line, with the latter spaced from the influent line for creating a flow of a liquid to be treated through the housing along a flow path; an axle rotatably journalled on the housing and arranged extending through the housing transverse to the flow path of the liquid to be treated between the influent line and the effluent line; a blade affixed to the axle for rotation therewith and agitating the liquid to be treated; and an ejecting nozzle connected to the housing for directing a flow of at least one of oxygen and ozone into the housing and toward the blade for causing the blade to mix the oxygen and ozone into the polluted liquid under pressure. By whipping the oxygen and ozone into the polluted water, and the like, in this manner, and at atom size bubbles, the color and pollutents are readily bleached out of the polluted liquid in a known manner. Further, electrostatic charges formed on the agitating blade create ozone when air, or oxygen, is pumped onto the blade. In this manner, the oxygen and ozone are more effective, and both stay in the water longer.

According to a preferred construction of the present invention, a plurality of axles are journalled in substantially parallel relationship transverse of the liquid flow path between the influent line and the effluent line of the housing. Each of the axles has associated therewith a baffle disposed alternately with and substantially parallel to the axles for creating a tortuous path by the axles between the influent line and the effluent line. Further, a cover may be arranged over the baffles for further defining the tortuous flow path. By arranging the baffles extending from one of the side walls of the housing toward the opposite side wall, but spaced therefrom, it will be appreciated that this arrangement forms a desirable winding flow path through at least a portion of the housing. Additionally, a plurality of compartments are formed, each compartment having an injection nozzle associated therewith and disposed for directing oxygen, preferably in the form of air, or ozone toward the agitating blades.

Each axle advantageously includes a plurality of blades affixed thereto, with each of the blades being a substantially U-shaped member having a back portion journalling a pair of substantially parallel legs affixed to the associated axle adjacent respective ones of the side walls of the housing. In this manner, the back portion of the blade extends substantially the entire longitudinal extent of the associated axle within the housing.

An advantageous feature of the present invention is the provision of a normally open vent having associated therewith the valve element of a float valve arrangement mounted on the housing. The purpose of the vent and float valve is to control the level of liquid within the housing by closing the vent whenever the liquid level reaches a predetermined height in order to increase pressure within the housing and thus increase the flow of liquid out of the effluent line and from the housing.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view showing an oxidation and ozonation chamber according to the present invention.

FIG. 2 is a fragmentary, sectional view, taken generally along the line 2—2 of FIG. 1.

FIG. 3 is a fragmentary, sectional view taken generally along the line 3—3 of FIG. 2.

FIG. 4 is a fragmentary, sectional view taken generally along the line 4—4 of FIG. 2.

FIG. 5 is a fragmentary, perspective view showing an agitator blade assembly according to the invention.

DESCRIPTION OF THE PREFERRED EMBODIMENTS

Referring now more particularly to FIGS. 1 through 4 of the drawings, an oxidation and ozonation chamber 10 according to the present invention for treating a liquid 12, such as sewage and the like, has a housing 14 provided with an influent line 16 and an effluent line 18. The latter is spaced from line 16 for creating a flow path of liquid 12 through housing 14 in a manner to be described in greater detail below. While chamber 10 may be employed as the basic unit of sewage, and the like, treatment system, it is preferred that chamber 10 be included in a more comprehensive water treatment system such as that disclosed in my co-pending application Ser. No. 539,908, filed Jan. 9, 1975, the dislosure of which is hereby incorporated herein.

Journalled in substantially parallel relationship transverse of the flow path of liquid 12 between lines 16 and 18 is at least one, and preferably a plurality, of rotatable axles. While it will be appreciated that the number of axles may vary, three axles are illustrated for the purpose of example, and are designated by the reference numerals 20, 22, and 24. Each of these axles 20, 22 and 24 is provided with a respective blade assembly 26, 28 and 30, the construction of which is to be described below, for rotation with the associated axle in order to agitate liquid 12 and facilitate mixing of oxygen and ozone into liquid 12 in a manner and for a purpose to become apparent below.

Associated with each blade assembly 26, 28 and 30 is an injection nozzle pair 32, 34, and 36, connected to housing 14 for directing a flow of at least one of oxygen and ozone into the housing 14 and toward the associated blade assembly 26, 28, and 30. The blade assemblies will act to put the oxygen and ozone and facilitate mixing of the oxygen and ozone with liquid 12, while electrostatic charges formed on blade assemblies 26, 28, and 30 by the frictional forces generated during the movement of the blade assemblies through the liquid 12 will act to create additional ozone so as to still further increase the overall efficiency of the device.

Housing 14 is further provided with a baffle 38 which advantageously includes a plurality of preferably planar, substantially parallel plates 40, 42, and 44 disposed alternating with and substantially parallel to axles 20, 22, and 24 for creating a tortuous flow path by axles 20, 22, and 24 between influent line 16 and effluent line 18 of housing 14. By thus forming a tortuous flow path by the blade assemblies 26, 28, and 30 associated with the axles, there is assured the requisite turbulent flow necessary for achieving good mixing of the oxygen and ozone with the liquid 12.

Housing 14 is preferably substantially rectangular in configuration and has a pair of end walls 46 and 48, a pair of longitudinal side walls 50 and 52, a top wall 54, and a bottom wall 56. The aforementioned walls are advantageously joined to one another along marginal edges thereof to form an enclosure which is illustrated in the drawings. Influent line 16 is advantageously disposed in one of the end walls, specifically end wall 46, at a point therein adjacent the bottom wall 56, while the effluent line 16 can be disposed in bottom wall 56 adjacent the other of the end walls, specifically wall 54, for forming a plurality of compartments 58, 60 and 62, with one compartment being provided for each of the axles 20, 22, and 24, respectively.

Referring now to FIG. 5 of the drawings, each blade assembly 26, 28, 30 includes a plurality of blades 64, four such blades being illustrated, affixed to each of the associated axles 20, 22, and 24, respectively. Each blade 64 is a substantially U-shaped member having a back portion 66 joining a pair of substantially parallel legs 68 and 70 affixed to the associated axle 20, 22, 24. Preferably, legs 68 and 70 are joined to an associated axle adjacent respective ones of the side walls 50 and 52 of housing 14 as can be seen, for example, in FIG. 4 of the drawings. Back portion 66 advantageously extends substantially the entire longitudinal extent of the associated axles 20, 22, 24 with housing 14 as can also thus be seen from the aforementioned FIG. 4. In this manner, blade assemblies 26, 28, and 30 agitate the entire transverse extent of housing 14 in order to effectively mix the oxygen and ozone with the liquid 12 along the greater part of the flow path formed between lines 16 and 18 of housing 14.

A normally open vent 72, in the form of an aperture in top wall 54 and the line extending therefrom, is provided in top wall 54 to facilitate the discharge of used air from housing 14. Thus, chamber 10 automatically releases the vent air after oxygen has been taken out of it, carrying dead germs and viruses out of housing 14 with the dead air. Further, a float valve 74 is mounted on housing 14 and has a valve element 76 arranged for blocking vent 72 and increasing the pressure within housing 14 and thus increasing the flow of liquid 12 out of line 18 from housing 14 whenever the level of liquid 12 within housing 14 reaches a predetermined maximum level. As can be readily seen from FIG. 2 of the drawings, float valve 74 includes a float 78, constructed in a conventional manner, pivotally connected to a lever 80 itself hinged as by hinge 82 to the inner surface of end wall 46 adjacent top wall 54. Valve element 76 is pivotally connected to lever 80, and under the influence of hinge 82 and float 78, so as to be seated within vent 72 and continuously open and close the aperture partially forming vent 72 as a function of the level of liquid 12 within housing 14.

A seat 84 is advantageously arranged essentially parallel to top and bottom wall 54 and 56 of housing 14 and is disposed between the top and bottom wall 54 and 56. Further, seat 84 extends between side walls 50, 52 along end wall 46, and is arranged supported by the baffle plates 40, 42 and 44 for further defining the flow of liquid 12 through housing 14.

Referring again to FIGS. 1 and 2 of the drawings, a plurality of motors 86 is provided; one motor 86 for each of the axles 20, 22, and 24 provided in housing 14. By connecting the output shafts of the motors 86 directly to the axles 20, 22, and 24, individual control of the rotation of the axles can be readily achieved. Motors 86 may be, for example, conventional electric motors and will not be described further herein.

Injection pair nozzles 32, 34, and 36 are mounted in bottom wall 56 of housing 14, with each compartment 58, 60 and 62 formed by the baffle plates 40, 42, and 44 being provided with a respective nozzle pair 32, 34, and 36. Each nozzle pair 32, 34, and 36 is directed toward the axles 20, 22, and 24 and blade assemblies 26, 28, and 30 disposed in the associated compartment 58, 60, and 62 in order to direct the oxygen and/or ozone directly onto the blade assemblies.

As will be appreciated, blade 64 of blade assemblies 26, 28, and 30 may be constructed in any suitable, known manner, such as bending the blade 64 from rods and rolling the thus bent rods onto the associated axles 20, 22, and 24.

As will be appreciated from the above description and from the drawings, as motors 86 turn the shafts, or axles, 20, 22, and 24, the agitating blade assemblies 26, 28, and 30 chop the air delivered from air compressors (not shown) and ozone from ozone generators (not shown) being injected into the liquid 12 by injection nozzles 32, 34, and 36 at, for example, 1720 rpm. This agitation bleaches and oxidizes liquid 12 and discharges used air out of vent 71 automatically. Chamber 10 is designed to mix oxygen and ozone into liquid 12 at a high rate of speed. By mixing under pressure, due to the injection of oxygen and ozone by nozzles 32, 34, and 36, the oxygen and ozone are more effective and both stay in liquid 12 longer. As has been proven in tests, the ozone kills germs and virus in the waste water or other effluent forming liquid 12. The agitator blades 64, which are turning at a high rate of speed, create ozone by means of the electrostatic charges formed on the blade 64 due to the frictional forces generated by movement of blade 64 through liquid 12, when air, or oxygen, is directed onto the blade 64 by nozzles 32, 34, and 36. Chamber 10 automatically releases vent air after oxygen has been taken out of it, carrying dead germs and virus together with the dead air out vent 72. Chamber 10 can reduce c.o.d. by as much as 50% and can clear about 80% of the color of polluted water, and the like.

To summarize, the agitating blade assemblies turning at, for example, 1720 rpm, puts oxygen and oxone into polluted water at atom size bubbles and bleaches color and pollutants out of the water. An important feature of the present invention is the injection of oxygen and ozone under pressure against the agitating blade assemblies. The electrostatic charge of the blades, formed by frictional forces generated during movement of the blades through the water, creates ozone when air, containing perhaps 20% oxygen, is pumped through the blades.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An oxidation and ozonation chamber for treating a liquid, comprising, in combination:
   a. a housing having an influent line and an effluent line, with the latter spaced from the influent line for creating a flow of a liquid to be treated through the housing along a predetermined path;
   b. a rotatable axle arranged extending through the housing transverse to a path directly between the influent line and the effluent line of the housing;
   c. a blade affixed to the axle for rotation therewith and agitating the liquid in order to form an electrostatic charge thereon and to mix oxygen and ozone with the liquid; and
   d. separate injecting means connected to the bottom of the housing for injecting and directing a flow of at least one of oxygen and ozone into the housing and toward the blade, for combining the electrostatic charge formed on the blade to create ozone in the present of a flow of oxygen, a plurality of axles are journalled in substantially parallel relationship transverse of the direct line between the influent line and the effluent line, and further including baffle means including a plurality of planar, substantially parallel plates disposed alternating with and substantially parallel to the axles for creating a tortuous flow by the axles between the influent line and effluent line of the housing, the housing being substantially rectangular in configuration and has a pair of end walls, longitudinal side walls, and top and bottom walls, the walls being joined to one another to form an enclosure, with the influent line being disposed in one of the end walls adjacent the bottom wall, and the effluent line being disposed in the bottom wall adjacent the other of the end walls, the axles lie in a plane substantially parallel to the bottom wall and are substantially uniformly spaced along the longitudinal side walls from adjacent the influent line, the plates of the baffle means alternatingly extending from one and the other of the side walls along the bottom wall toward, but spaced from, the opposite of the side walls and from the top wall for forming a plurality of compartments, one compartment to each of the axles, a plurality of blades are affixed to each of the axles, with each of the blades being a substantially U-shaped member having a back portion joining a pair of substantially parallel legs, the legs being affixed to the associated axle adjacent respective ones of the side walls of the housing, the back portion extending substantially the entire longitudinal extent of the associated axle, a normally open vent is provided in the top wall of the housing, and further including a float valve mounted on the housing and having a valve element arranged for effectively blocking the vent increasing the pressure within the housing and thus increasing the flow of liquid out the effluent line from the housing whenever the liquid in the housing reaches a predetermined level.

2. A structure as defined in claim 1, wherein a seat is arranged substantially parallel to the top and bottom walls of the housing and disposed between the top and bottom walls, the seat extending between the side walls of the housing and along the end wall in which the influent line is provided, and arranged supported by the baffle plates further confining the flow of liquid through the housing.

3. A structure as defined in claim 2, wherein the separate injecting means includes a fluid nozzle mounted on the bottom wall of the housing, each compartment formed by the baffle plates being provided with a fluid nozzle, with each nozzle being directed toward the axle and blades disposed in the associated compartment.

4. An oxidation and ozonation chamber for treating a liquid, comprising, in combination:
   a. a housing having an influent line and an effluent line, with the latter spaced from the influent line for creating a flow of a liquid to be treated through the housing along a predetermined path;
   b. a rotatable axle arranged extending through the housing transverse to a path directly between the influent line and the effluent line of the housing;
   a blade affixed to the axle for rotation therewith and agitating the liquid in order to mix oxygen and ozone with the liquid; and
   d. separate injecting means connected to the bottom of the housing for directing a flow of at least one of oxygen and ozone into the housing and toward the blade, with an electrostatic charge formed on the blade creating ozone in the presence of a flow of oxygen, the housing is substantially rectangular in configuration and has a pair of end walls, longitudinal side walls, and top and bottom walls, the walls being joined to one another to form an enclosure, a plurality of substantially parallel rotatable axles being journalled on the housing, the axles lying in a plane substantially parallel to the bottom wall of the housing and being substantially uniformly spaced from one another along the longitudinal side walls of the housing from adjacent the end wall in which the effluent line is provided, baffle means including a plurality of planar, substantially parallel plates disposed alternately with and substantially parallel to the axles for creating a tortuous flow by the axles between the influent line and effluent line of the housing, the separate injecting means includes a fluid nozzle mounted in the bottom wall of the housing, each compartment formed by the baffle plates being provided with a fluid nozzle, with each nozzle being directed toward the axle and blade disposed in the associated compartment, a normally open vent is provided in the top wall of the housing, and further including a float valve mounted on the housing and having a valve element arranged for effectively blocking the vent increasing the pressure within the housing and thus increasing the flow of liquid out the effluent line from the housing whenever the liquid in the housing reaches a predetermined level.

5. A structure as defined in claim 4, wherein the baffle means including the plurality of substantially parallel plates arranged alternating with the axles, further including a seat arranged substantially parallel to the top and bottom walls of the housing and disposed between the top and bottom walls, the seat extending between the side walls of the housing and along the one of the end walls of the housing in which the influent line is provided, the seat being arranged supported by the plates of the baffle means for further defining the flow of liquid through the housing.

* * * * *